United States Patent [19]

Liebert

[11] 4,396,561
[45] Aug. 2, 1983

[54] PROCESS FOR MANUFACTURING MINERAL-WOOL MATS

[76] Inventor: Horst Liebert, Reisbergstrasse 14, 7101 Obergruppenbach, Fed. Rep. of Germany

[21] Appl. No.: 195,626

[22] Filed: Oct. 9, 1980

[30] Foreign Application Priority Data

Oct. 15, 1979 [DE] Fed. Rep. of Germany ....... 2941664

[51] Int. Cl.³ .............................................. B29C 6/00
[52] U.S. Cl. ......................................... 264/6; 264/37; 264/109; 264/122; 264/126
[58] Field of Search ................ 264/6, 37, 8, 122, 126, 264/109

[56] References Cited

U.S. PATENT DOCUMENTS 2,717,419 9/1955 Dickey .................................. 264/37
3,360,592 12/1967 Rau et al. ................................. 264/8
4,249,906 2/1981 Howell .................................. 264/37

Primary Examiner—James R. Hall
Attorney, Agent, or Firm—Clement and Ryan

[57] ABSTRACT

In the manufacture of mineral-wool mats or slabs, the raw materials are melted in a melting furnace and are spun to fibers in a spinner. The fibers, after admixture of a resin binder, are deposited so as to be formed to wool mats in a collecting chamber, then cured, trimmed at the sides and cut up into lengths. Both during spinning and during trimming, cutting up into lengths and a subsequent final inspection and check for defects, waste products arise. In order not to have to deliver these waste products, as hitherto, to a proper dump but, instead, to be able to recycle them direct to the production process, the waste products are broken up into smaller pieces and/or unravelled, heated and then briquetted while hot, whereupon the briquettes, possibly after cooling down and interim storage, are combined with the raw materials which are to be melted and thus returned via the melting furnace into the production process.

2 Claims, 1 Drawing Figure

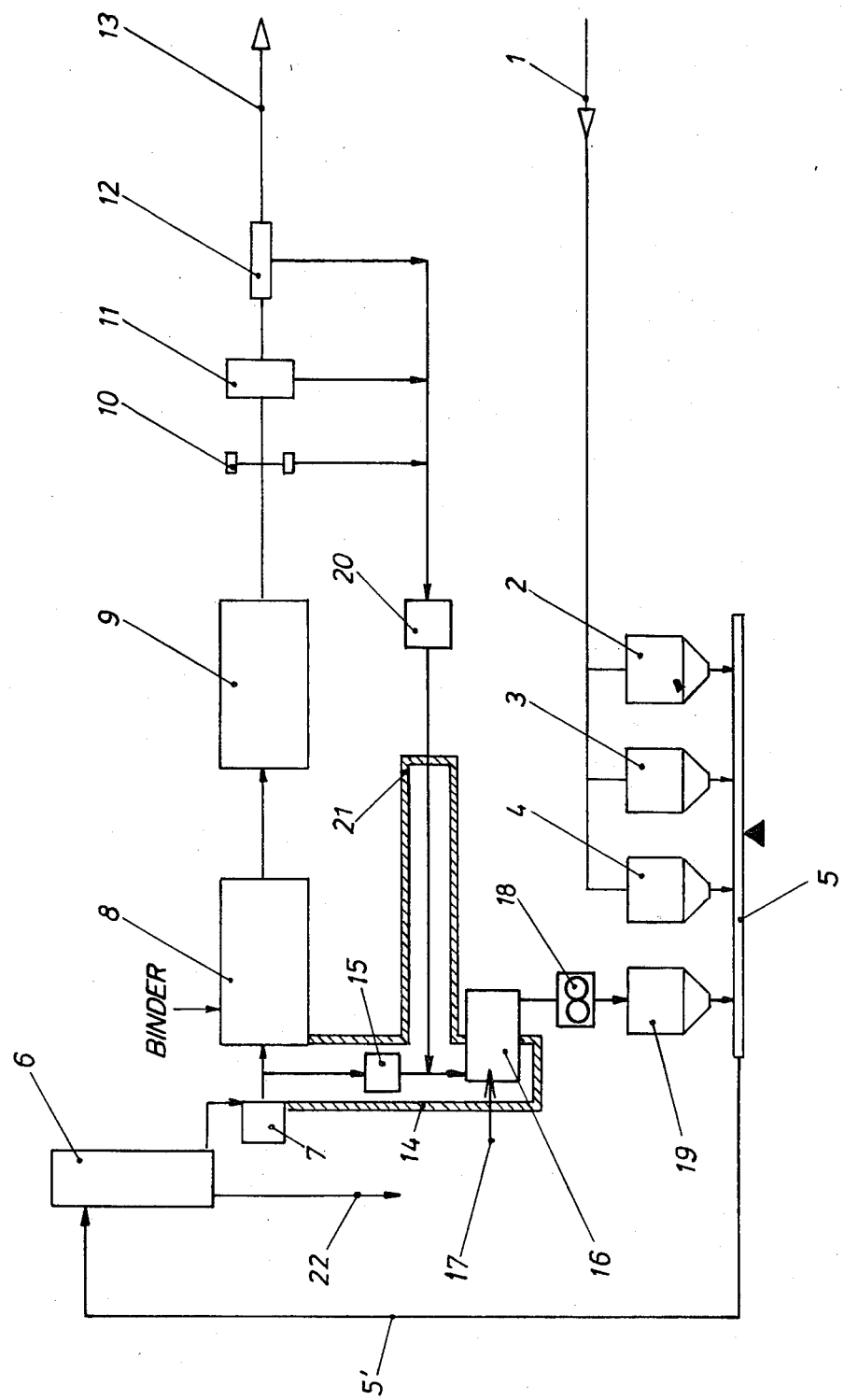

4,396,561

PROCESS FOR MANUFACTURING MINERAL-WOOL MATS

TECHNICAL FIELD

This invention concerns a process and equipment for manufacturing mineral-wool mats, in which raw materials are melted in a melting furnace, transformed to mineral fibers in a spiner, a binder resin subsequently being admixed to the fibers which are deposited to form mats in a collection chamber, cured in a curing chamber, then trimmed at the longitudinal sides and cut up into lengths. The invention is directed to the re-utilization of waste products obtained in the manufacturing process.

BACKGROUND ART

Mineral-wool mats are being used to a growing extent as heat-insulating and soundproofing elements, as well as for fire protection.

In the manufacture of mineral-wool mats, the raw materials which are stored in bins are fed via a weighing and conveying system to a melting furnace, in which they are melted at elevated temperatures. The fluid stream of material flows into a spinner which produces thin mineral fibers, said fibers being deposited, after a resin binder has been added, in the form of a continuous resin-impregnated mat in a collection chamber. During spinning and prior to the depositing process, there is a continuous release of mineral waste products having temperatures near the melting point and being in the form of beads of material from the melting process, slag, loose bits of fibers and such like. In an adjoining curing chamber, the raw mat is obtained in the required final thickness. This raw mat is inexact in width and therefore has to be trimmed at the sides. In further steps, it thus passes through a trimming station, in which it is trimmed, and then through a sizing station, in which it is cut to the desired length. An inspection and check for defects is the last step of the manufacturing process.

A shortcoming of this known manufacturing process is the unduly high proportion of waste products in the form of beads of material from the melting process, slag, loose bits of fibers obtained immediately downstream of the spinner, as well as of resin-impregnated pieces cut off the edges—some of which pieces have not been cured—which are obtained at the trimming station and entire scrap slabs from the inspection and check for defects.

These waste products have, so far practically without exception, been delivered to a suitable dump, as they cannot be utilized in the form in which they are obtained.

The purpose behind the invention is to make use of the waste products.

It is therefore an object of the invention to further develop the known process for manufacturing mineral-wool mats in such a manner that practical use can be made of the waste products.

It is a further object of the invention to devise equipment for performing the process according to the invention.

DISCLOSURE OF THE INVENTION

In accordance with the invention, in the known process mentioned at the beginning for the continuous manufacture of mineral-wool mats, mineral waste products (spinning waste) including slag particles having temperatures near the melting point which are continuously obtained after the spinning and prior to the depositing step, are broken up into smaller pieces while hot, reheated (*)to compensate for in-process cooling and then hot-briquetted, said briquettes subsequently being combined with the raw materials to be melted.

(*)to plasticizing temperature (approx. 700°–740° C.)

As an improvement, the briquettes are stored after cooling down, prior to being added to the raw materials. This interim storing, just like the storing of the raw materials, can be done in bins, from which the briquettes are likewise removed and conveyed into the melting furnace.

In a further development of the process in accordance with the invention, provision is made for the mineral waste products arising from the trimming and cutting up of the wool mat(s) into lengths to be unravelled, pre-heated in loosened-up form and added to the hot waste products released during spinning before the latter are made into briquettes—expediently before they are re-heated and any breaking up into smaller pieces is done.

The process according to the invention enables the waste products to be returned directly into the production process. In the zone between the spinner and the collection chamber, in which the major portion of the waste products continuously arises with temperatures near the melting point in the form of beads of material from the melting process, fibers and slag, these waste products have a very high heat content which is largely preserved through the direct processing and turned to use for making the briquettes.

According to a further aspect of the invention, equipment is proposed for performing the invention, said equipment being characterized by a heat-insulated chamber to be located directly following the spinner and through which the wool passes on its way to the collection chamber, in said heat-insulated chamber there being arranged a crushing machine to break up the mineral waste products obtained after spinning, including the slag released from the melting furnace, a through-type furnace for heating the broken-up waste products being connected with said heat-insulated chamber. Said equipment is further characterized by a roller briquetting machine for hot briquetting and conveying means for recycling the produced briquettes into a melting furnace upstream of the spinner. The heat-insulated chamber prevents the high heat content of the spinning waste products and the good briquetting properties of the latter owing to their fresh surfaces from being lost. They can therefore function as a bonding agent in the briquetting process, especially in connection with the mat waste.

A further development of this equipment makes provision for a bin for interim storage of the briquettes located downstream of the hot briquetting machine.

To enable the fibers and clumps of fibers which emerge from the unravelling machine for the waste products from trimming and cutting the mat material into lengths first to be pre-heated, it is expedient for the heat-insulated chamber to have, in the zone behind the crushing machine, a pre-heating chamber, into which the outlet of the unravelling machine extends. Subsequently, the broken-up waste products are united with the pre-heated fibers and clumps of fibers and pass together with them into the through-type furnace. In this way, the unravelled mat waste is pre-heated, before it and the spinning waste products pass into the through-type furnace and, from there, into the hot briquetting machine. The heat energy supplied in the through-type furnace serves mainly to compensate for heat losses.

The hot and, therefore, still not solidified coarse waste product emerging from this through-type furnace is pressed into briquettes of defined sizes, e.g., 150 to 200 cm$^3$, in the roller briquetting machine, said briquettes undergoing interim storage, possibly after being cooled, before they are recycled. As will be apparent to one skilled in the art, the size and shape of the briquettes have to be matched to the size and shape of the raw materials. Soap-bar size and shape are in many cases quite suitable.

It has been shown that the process according to the invention can be performed with no technical trouble and inexpensively with known machines, especially if the broken-up spinning waste products and the unravelled mat waste products are briquetted while hot by utilizing their heat content after additional heating.

The invention makes it possible to comply with more stringent statutory regulations on environmental protection and to combat effectively the increasing costs of removal and proper dumping of such waste.

DESCRIPTION OF PREFERRED EMBODIMENT AND BRIEF DESCRIPTION OF THE DRAWING

An illustrative embodiment of the invention, its novel features and advantages are explained in greater detail, reference being made to the accompanying drawing, which shows a flow diagram for a plant to manufacture mineral-wool mats and equipment for performing the process according to the invention.

Via a conveyor line 1, raw materials reach the bins 2, 3 and 4, from which they are taken via a weighing system 5 and other conveying equipment 5' to a melting furnace 6. In the latter, they are melted and made to flow for feeding in a melted state to a spinner 7, comprising fast-rotating rolls, in which thin mineral fibers are produced. Said fibers then pass to a collection chamber 8. In the latter, the fibers are impregnated with a resin binder, which binds the fibers together in the mat. In an adjoining curing chamber 9, the raw mat is obtained in the required final thickness. It then passes through a trimming station 10, in which it is trimmed lengthwise at the two edges, and subsequently to a sizing station 11, in which the produced continuous mat is cut up crosswise into long or short mats, as desired. Final inspection and checking for defects then follows at station 12, where mats with defects are segregated. Those mats which have passed the check for defects as being satisfactory are carried away by a conveyor 13 for subsequent packing.

Whereas the waste products arising downstream of the spinner, the trimming station 10, the sizing station 11 and the final inspection station 12 have so far, without exception, been delivered to a suitable dump, because they cannot be used in the form in which they are obtained, they are delivered in accordance with the invention to a heat-insulated chamber 14. This is connected directly with the spinner and the collection chamber 8, so that the waste products arising downstream of the spinner pass directly into it. The heat-insulated chamber 14 is constructed in such a manner that these waste products pass into a crushing machine 15, e.g., a pin-roller crusher, set up inside the chamber. Located behind said crushing machine the chamber 14 has a laterally projecting pre-heating chamber 21, into which pieces containing resin beads cut off the edges and entire scrap slabs which are obtained at the trimming station 10, the sizing station 11 and the final inspection station 12 are fed via an unravelling machine 20 for pre-heating. The streams of material then unite and pass inside the chamber into a through-type furnace 16. Heat is supplied via a burner 17 to the latter, in which the waste products are heated mainly to compensate for heat losses and to obtain the temperature required for the subsequent hot briquetting in a hot briquetting machine 18. The hot and, therefore, still not solidified coarse waste products emerging from the furnace 16 are pressed into briquettes of defined sizes and shapes—typically 150 to 200 cm$^3$ and soap bar shaped—in the hot briquetting machine 18 and then pass, after cooling off, into a separate bin 19. As this bin is likewise arranged above the weighing system 5, the melting furnace 6 can be charged, in line with the overall schedule for the production process, both with raw materials and with the treated waste products via the conveying equipment 5' without extra transportation routings being involved.

The waste products downstream of stations 10, 11 and 12 are obtained in cut-off pieces or forms which have already been pressed and bonded together by resin. They therefore first pass through at least one unravelling machine 20 and the pre-heating chamber 21 in loosened-up form, before they are fed to the through-type furnace 16 together with the very hot spinning waste stream released during spinning. They can also join the latter stream ahead of the crushing machine 15, if it is desirable to break them up still more than in the unravelling machine 20.

Utilization of the iron which is contained in the raw material and is liberated in the melting process is familiar and tapping of it at the bottom of the melting furnace is included at 22 in the drawing for the sake of completeness.

What is claimed is:

1. A process for salvaging treated waste products from the manufacture of mineral wool mats in which raw materials are melted in a melting furnace and then continuously spun into fibers in a spinner, a first category of treated mineral waste products, including slag from said melting furnace and slag and loose fibers from said spinner, being produced during said melting and spinning;

in which the fibers thus spun are thereafter mixed with a binder and while still at temperatures near the melting point are deposited as a continuous wool mat, then cured, and thereafter trimmed at the sides, cut up into desired lengths and finally inspected;

and in which a second category of treated mineral waste products, including collected loose fibers with binder, pieces of bonded fibrous mats resulting from the trimming and cutting up of the wool mat into lengths, and rejected defective whole mats, is produced during said depositing, trimming, cutting and inspecting, and for preparing said treated waste products for re-use in said manufacture, which comprises:

(a) gathering said first category of treated mineral waste products resulting from said melting and spinning;

(b) maintaining said first category of mineral waste products at a temperature near the melting point of said products;

(c) breaking the pieces of mineral waste products in said first category up into smaller pieces while still at a temperature near said melting point;

(d) gathering said second category of treated mineral waste products that results from said mixing with a binder, trimming, sizing and final inspection;

(e) pulling apart the pieces in said second category of mineral waste products;

(f) pre-heating the pieces in said second category of mineral waste products in loosened-up form;

(g) adding said pulled-apart pieces in said second category of treated mineral waste products to said first category of treated mineral waste products;

(h) further reheating all said mineral waste products that have been added together to plasticizing temperature to compensate for any cooling;

(i) transforming all said reheated treated mineral waste products into briquettes while hot; and (j) subsequently adding said briquettes to additional quantities of said raw materials to be melted in said manufacture of mineral wool mats.

2. The process of claim 1 in which said briquettes are stored for a period of time prior to being added to said additional quantities of raw materials.

* * * * *